US009065863B1

(12) United States Patent
Tharakan et al.

(10) Patent No.: US 9,065,863 B1
(45) Date of Patent: Jun. 23, 2015

(54) DETERMINING ELIGIBILITY OF A DEVICE TO AUTO-ENROLL IN A DOMAIN

(71) Applicant: Google Inc., Mountain View, CA (US)

(72) Inventors: Royans Kurian Tharakan, San Jose, CA (US); Sumit Gwalani, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 205 days.

(21) Appl. No.: 13/912,105

(22) Filed: Jun. 6, 2013

Related U.S. Application Data

(60) Provisional application No. 61/794,970, filed on Mar. 15, 2013.

(51) Int. Cl.
G06F 15/16 (2006.01)
H04L 29/12 (2006.01)

(52) U.S. Cl.
CPC .................................. H04L 61/2503 (2013.01)

(58) Field of Classification Search
CPC .... H04L 63/08; H04L 63/083; H04L 63/0853
USPC .......................... 709/219, 227, 245, 246, 247
See application file for complete search history.

(56) References Cited

U.S. PATENT DOCUMENTS

2003/0115267 A1* 6/2003 Hinton et al. ................. 709/204
2013/0318343 A1* 11/2013 Bjarnason et al. ............ 713/157

OTHER PUBLICATIONS

"Auto Enrollment Enterprise Gateway"—GlobalSign, Oct. 2012 https://www.globalsign.com/en/resources/datasheet-auto-enrollment-enterprise-gateway.pdf.*

* cited by examiner

Primary Examiner — Randy Scott
(74) Attorney, Agent, or Firm — McDermott Will & Emery LLP

(57) ABSTRACT

A method for determining auto-enrollment eligibility for an electronic device with an enterprise domain is provided. The method includes generating a reverse lookup of the IP address of the host through which an electronic device is requesting initialization in order to determine an associated domain name. The method also includes comparing the associated domain name to a list of enterprise domains and determining if the electronic device is eligible to auto-enroll with the an particular enterprise domain. The method also includes determining if the enterprise domain has an available license for the type of electronic device and sending a request to the electronic device to initiate auto-enrollment. Systems and machine-readable media are also provided.

20 Claims, 5 Drawing Sheets

US 9,065,863 B1

DETERMINING ELIGIBILITY OF A DEVICE TO AUTO-ENROLL IN A DOMAIN

CROSS-REFERENCE TO RELATED APPLICATIONS

The present application claims the benefit of priority under 35 U.S.C. §119 from U.S. Provisional Patent Application Ser. No. 61/794,970, filed on Mar. 15, 2013, the disclosure of which is hereby incorporated by reference in its entirety for all purposes.

TECHNICAL FIELD

The present disclosure generally relates to determining if a device should be automatically enrolled in a domain, and more particularly to performing a reverse lookup of the internet protocol (IP) address where the device request originates from to determine if a request should be sent to the device to initiate an auto-enrollment process.

BACKGROUND

Electronic devices (e.g., mobile device or tablet computer) are sometimes registered to an enterprise domain using auto-enrollment. In such setups, when an enterprise buys a new electronic device the service provider maps the device identification (ID) to the enterprise domain and the enterprise domain administrator enables auto-enrollment. When the user initializes the device, the device identifies if it needs to auto-enroll by sending a part of its serial number to the service provider's server, to which the service provider's server sends a batch of serial numbers matching the partial serial number sent by the device. The device compares its full serial number to the batch of serial numbers sent by the service provider and determines that it should initiate the auto-enrollment process if there is a serial number match. Such a serial number to domain name mapping process for detecting whether auto-enrollment of the device to the enterprise is needed requires the device to be mapped to the organization by the service provider, which can be an expensive process.

SUMMARY

The subject disclosure relates to a computer-implemented method for determining auto-enrollment eligibility for an electronic device that includes receiving, at a service provider server, an initialization request from an electronic device. The method also includes identifying the internet protocol (IP) address from which the initialization request was sent and generating a reverse lookup of the identified IP address to determine an associated fully qualified domain name. The method further includes comparing the associated fully qualified domain name generated in the reverse lookup with one or more enterprise domains within a list of enterprise domains that have enabled auto-enrollment by reverse lookup and determining, based on the comparison, that the electronic device should initiate auto-enrollment if there is a match between the associated fully qualified domain name and the list of enterprise domains.

These and other aspects can include one or more of the following features. The method may also include generating a forward lookup of the associated fully qualified domain name to determine an associated IP address and comparing results of the forward lookup with results of the reverse lookup. Also, the method may include if the results of the forward lookup and the reverse lookup match, indicating that the authenticity of the reverse lookup is correct.

Additionally, the method may also include if the results of the forward lookup and the reverse lookup do not match, comparing the IP address to a list of IP addresses specified by one of a Classless Inter-Domain Routing (CIDR) block and a comma delimited set of subnets. The method may also include if the IP address is within either the range of the CIDR block or the set of subnets, indicating that the authenticity of the reverse lookup is correct and if the IP address is not within either the range of the CIDR block or the set of subnets, indicating that the authenticity of the reverse lookup is not proven.

Further, the method may include determining if the associated fully qualified domain name has an available license for the type of the electronic device. The method may also include if there is an available license for the electronic device type, sending a request to the electronic device to initialize an auto-enrollment process and if there is not an available license for the electronic device type, sending a notification to a designated contact at the associated fully qualified domain name. The method may further include wherein the enabled auto-enrollment by reverse lookup comprises specification of a particular auto-enrollment domain that an electronic device needs to map to, wherein the particular auto-enrollment domain is a subset of a verified domain that a domain administrator of the associated fully qualified domain name has control over.

The present disclosure also relates to a system for determining auto-enrollment eligibility for an electronic device that includes a memory storing executable instructions and a processor coupled to the memory configured to execute the stored executable instructions. The instructions cause the system to receive at a service provider server an initialization request from an electronic device and to identify the internet protocol (IP) address from which the initialization request was sent. The instructions also cause the system to generate a reverse lookup of the identified IP address to determine an associated fully qualified domain name and to compare the associated fully qualified domain name generated in the reverse lookup with one or more enterprise domains within a list of enterprise domains that have enabled auto-enrollment by reverse lookup. The instructions further cause the system to determine, based on the comparison, that the electronic device should initiate auto-enrollment if there is a match between the associated fully qualified domain name and the list of enterprise domains and to determine if the associated fully qualified domain name has an available license for the electronic device type.

These and other aspects can include one or more of the following features. The instructions may cause the system to generate a forward lookup of the associated fully qualified domain name to determine an associated IP address and compare results of the forward lookup with results of the reverse lookup. The instructions may also cause the system to indicate that the authenticity of the reverse lookup is correct if the results of the forward lookup and the reverse lookup match. The instructions may further cause the system to compare the IP address to a list of IP addresses specified by one of a Classless Inter-Domain Routing (CIDR) block and a comma delimited set of subnets if the results of the forward lookup and the reverse lookup do not match.

Additionally, the system may also execute instructions causing the system to indicate that the authenticity of the reverse lookup is correct if the IP address is within either the range of the CIDR block or the set of subnets. The instructions may further cause the system to indicate that the authenticity of the reverse lookup is not proven if the IP address is not within either the range of the CIDR block or the set of subnets. The instructions may also cause the system to send a request to the electronic device to initialize an auto-enrollment process if there is an available license for the electronic device type. The instructions may further cause the system to send a notification to a designated contact at the associated fully qualified domain name if there is not an available license for the electronic device type. The system may further include wherein the enabled auto-enrollment by reverse lookup comprises specification of a particular auto-enrollment domain that an electronic device needs to map to, wherein the particular auto-enrollment domain is a subset of a verified domain that a domain administrator of the associated fully qualified domain name has control over.

The present disclosure further relates to a non-transitory machine-readable medium comprising instructions stored therein, which when executed by processors, cause the processors to perform operations that include receiving, at a service provider server, an initialization request from an electronic device and identifying an Internet protocol (IP) address from which the initialization request was sent. The operations also include generating a reverse lookup of the identified IP address to determine an associated fully qualified domain name and comparing the associated fully qualified domain name generated in the reverse lookup with one or more enterprise domains within a list of enterprise domains that have enabled auto-enrollment by reverse lookup. The operations further include determining if the authenticity of the reverse lookup is correct and determining that the electronic device is eligible for auto-enrollment if the authenticity of the reverse lookup is correct. The operations also include determining if the associated fully qualified domain name has an available license for the type of the electronic device and sending a request to the electronic device to initialize an auto-enrollment process if there is an available license for the electronic device type.

These and other aspects may provide one or more of the following advantages. Systems may determine if an electronic device should auto-enroll more efficiently and without requiring the system to send batches of device serial numbers out to the initializing device or to add device serial numbers to an enterprise domain. The electronic devices may be more easily redistributed throughout an organization or enterprise and may be auto-enrolled into an enterprise domain without having to be purchased directly from the service provider.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several implementations of the subject technology are set forth in the following figures.

DETAILED DESCRIPTION

Figure 1:
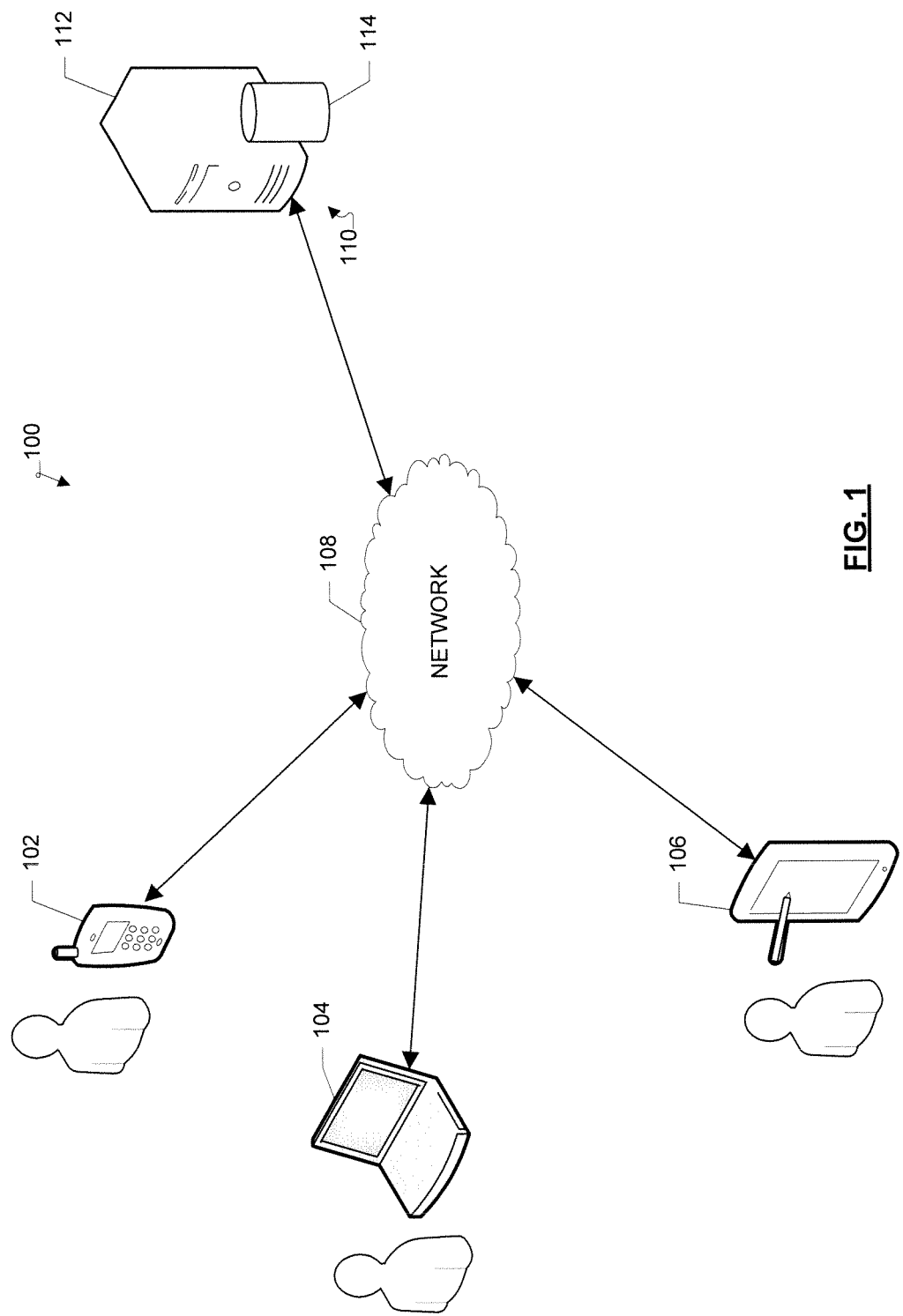
FIG. 1 is a diagram of an example system for determining if a client device should auto-enroll in an enterprise domain.

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

Determining if auto-enrollment of an electronic device to an enterprise domain should be requested may be based on performing a reverse lookup of the IP address of the domain from which the client device sends an initialization request. The electronic device sends a request to the service provider when it is initialized (e.g., turned on for the first time) and the service provider server checks the internet protocol (IP) address where the request originates from (e.g., reverse lookup of the RemoteHost IP address in the request). The service provider server compares the host found in the reverse lookup to a list of enterprise domains that have enabled auto-enrollment by reverse lookup. If there is a match, the service provider server checks to see if the matching enterprise domain has an available license. If a license for the matching enterprise domain is available, the service provider determines that the electronic device should auto-enroll and sends a request to the device to initiate the auto-enrollment process. Alternatively or in addition to the IP address, other mechanisms may be used to determine auto-enrollment, such as accessibility to a certain domain/server from the client or some other identification of the device (e.g., a certification in a security chip or a universal serial bus (USB) token).

On the enterprise domain administration side, the domain administrator enables auto-enrollment-by-reverse-lookup in the administrative settings (e.g., cPanel). The domain administrator may also specify which auto-enrollment domain needs to be mapped to (e.g., a subset of the verified domain the enterprise has control over). Alternatively, the domain administrator may specify the size of the enterprise network by providing a Classless Inter-Domain Routing (CIDR) block or by providing a comma delimited set of subnets.

Heightened security may be provided by performing a simple comparison. If the forward lookup and the reverse lookup match, the authenticity of the reverse lookup is assumed to be correct. For example, the reverse lookup of the originating device request host IP address 123.123.123.123 is vpn.blogofy.com and the forward lookup of vpn.blogofy.com is the IP address 123.123.123.123. Even if the reverse lookup and forward lookup do not match, the authenticity may still be assumed if the IP address is within either the CIDR range or the set of subnets provided by the domain administrator. For example, if the reverse lookup of the originating device request host IP address 123.123.123.123 is vpn.blogofy.com and the forward lookup of vpn.blogofy.com is the IP address 123.123.123.56, then the authenticity of the domain would be confirmed if the vpn.blogofy.com domain administrator identified the network size as /24.

Methods and systems for providing a determination of whether a device should auto-enroll are provided herein. An enterprise (e.g., company or organization) may have an internet domain to which to which electronic devices should be registered. For example, a company may provide electronic devices (e.g., laptop computers, smart phones, or tablet computers) to its employees. When first powered up, the electronic device sends out an initialization request to the service provider in order that it may receive the services that are contracted for that device by the company.

The service provider needs to determine or authenticate which domain name that particular electronic device should be registered under in order to function correctly and to receive the contracted services. For example, a government organization may provide smartphones to various levels of its civil servants, where certain levels of civil servants are to utilize services associated with one government domain and other levels of civil servants are to utilize another government domain. Another example is a corporation with many subsidiaries that provides tablet computers to employees, where each employee's tablet computer should be registered to the subsidiary the employee works for in order to receive the correct services related to that subsidiary.

The service provider may use the IP address of the device (e.g., host server or client) from which the initialization request of the electronic device originates. For example, an employee receives a laptop computer with wireless communication capability upon starting employment with a company. The employee powers up the laptop, which is programmed to connect to the company servers and send an initialization request to the service provider. Since the company wants the device to be auto-enrolled in the company domain, the company has already set the domain to enable auto-enrollment. In particular, the company enables auto-enrollment by reverse lookup.

The service provider receives the request that was sent from the company server and determines the Remote Host IP address of the company server found in the header of the request. The service provider conducts a reverse lookup of the Remote Host IP address to find the domain to which the company server is registered. The service provider also maintains a list of enterprise domains that have enabled auto-enrollment by reverse lookup. A match between the domain of the company server found by reverse lookup and the server provider list of auto-enrollment by reverse lookup enabled domains indicates to the service provider that this particular electronic device should be auto-enrolled (e.g., registered) to the company domain.

FIG. 1 illustrates an example client-server network that provides for auto-enrollment of an electronic device. A network display 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to determine a fully qualified domain name through a reverse lookup of an IP address associated with a received internet communication. The computer instructions may also include instructions for comparing the determined domain name to a list of domains that have enabled auto-enrollment by reverse lookup, and determining if the domain has an available license. The computer instructions may further include instructions for performing a forward lookup of the enterprise domain and for comparing the results of the forward lookup to the results of the reverse lookup for security purposes, as well as for sending a message or request to the electronic device to initiate the auto-enrollment process.

Data store 114 may store information pertaining to, for example, the enterprise domains with auto-enrollment by reverse lookup enabled and the IP addresses associated with those enterprise domains. Server 110 may host an application within which some of the processes discussed herein are implemented. In some example aspects, electronic devices or client devices, as used interchangeably herein, 102, 104 and 106 can be computing devices such as smartphones, PDAs, portable media players, tablet computers, televisions or other displays with one or more processors coupled thereto or embedded therein, or other appropriate computing devices that can be used for running a mobile application.

Electronic devices 102, 104 and 106 may have one or more processors embedded therein or attached thereto, or other appropriate computing devices that can be used for accessing a host, such as server 110. In the example of FIG. 1, electronic device 102 is depicted as a smartphone, electronic device 104 is depicted as a laptop computer, and electronic device 106 is depicted as a tablet computer. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

The system (e.g., hosted at any combination of electronic devices 102, 104 or 106 and server 110), receives an initialization request for initialization from one of the electronic devices 102, 104 or 106 when the user of the device attempts to put the device into service. The initialization request message has header information that includes the IP address of the host server that sent the initialization request. The system performs a reverse lookup using the host server IP address in order to determine the domain name associated with the host server IP address. The system also compares the determined domain name with a list of enterprise domain names for which auto-enrollment by reverse lookup is enabled. If there is a match between the determined domain name and an enterprise domain name on the list, the system determines that the requesting electronic device is eligible for auto-enrollment with the enterprise domain of the host server.

The system may verify the authenticity of a match in several ways. The system may perform a forward lookup of the determined domain name to obtain the IP address associated with the domain name. If the results of the forward lookup and the reverse lookup match (e.g., reverse lookup of IP address "123.123.123.123" yields domain name "vpn.blogofy.com" and the forward lookup of domain name "vpn.blogofy.com" yields IP address "123.123.123.123"), then the authenticity of the reverse lookup is determined to be correct. However, if the results of the forward lookup and the reverse lookup do not match, the system may perform another check. For example, the system may compare the IP address from the initialization request to a size of an enterprise network specified by one of a Classless Inter-Domain Routing (CIDR) block and a comma delimited set of subnets. If the IP address is within either the range of the CIDR block or the set of subnets (e.g., the reverse lookup of IP address "123.123.123.123" yields domain name "vpn.blogofy.com," the forward lookup of domain name "vpn.blogofy.com" yields IP address "123.123.123.56" and the domain settings identify the network size as /24), then the authenticity of the reverse lookup is determined to be correct. Conversely, if the IP address is not within either the range of the CIDR block or the set of subnets (e.g., the reverse lookup of IP address "123.123.123.123" yields domain name "vpn.blogofy.com," the forward lookup of domain name "vpn.blogofyblogofy.blogofy.com" yields IP address "123.123.123.56" and the domain settings identify the network size as /XX), then the reverse lookup is determined to be not authentic or incorrect.

The system may also determine if the enterprise domain has any available licenses for the type of electronic device that is requesting initialization. If the enterprise does have an available license, the system may send a request to the electronic device to initiate auto-enrollment with the enterprise domain. On the other hand, if the enterprise does not have an available license, the system may send a message to the electronic device requesting that the user seek assistance from a contact within the enterprise domain (e.g., domain administrator or enterprise help desk). In addition, the system may send a message directly to the enterprise domain contact informing them of the need to acquire another license to support the electronic device. The enablement of auto-enrollment by reverse lookup within the settings of an enterprise domain may be configured to specify a particular auto-enrollment domain that the electronic device should map to. Here the particular auto-enrollment domain is a subset of a verified domain that a domain administrator of the domain name has control over.

Each electronic device 102, 104 and 106 may be a client device or a host device. In some example aspects, server 110 can be a single computing device such as a computer server. In other implementations, server 110 can represent more than one computing device working together to perform the actions of a server computer (e.g., cloud computing). The server 110 may host the auto-enrollment server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
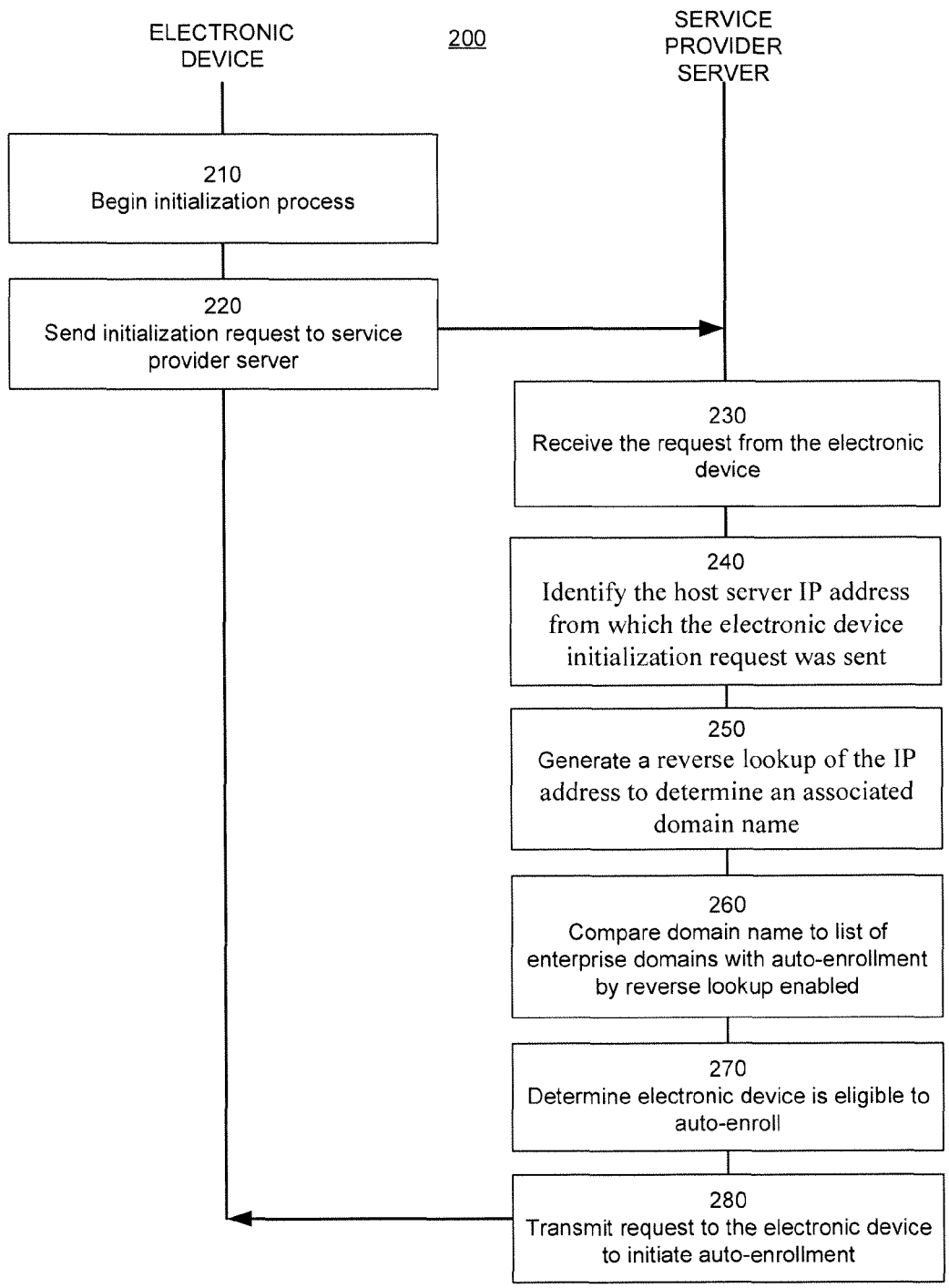
FIG. 2 illustrates a flow diagram of an example process for determining if a client device should auto-enroll in an enterprise domain.

FIG. 2 illustrates a flow diagram of an example process 200 for determining eligibility of an electronic device to auto-enroll in an enterprise domain. Process 200 begins at step 210 when an electronic device is powered up and begins the initialization process of the electronic device. For example, when the electronic device is powered up, it may connect to a host server of the enterprise that provided the electronic device to the user and request initialization from the host server. In step 220, the initialization request is sent to a server of the service provider that is contracted to provide services to the electronic device (e.g., the enterprise host server sends the request from the electronic device to the service provider server).

In step 230, the service provider server receives the request sent from the host server. In step 240, the service provider server identifies the host server IP address. For example, the service provider server may determine the host server IP address from the header information of the initialization request message. In step 250, the service provider server generates a reverse lookup of the host server IP address. The reverse lookup provides a domain name (e.g., a fully qualified domain name) that is associated with the host server IP address.

In step 260, the service provider server compares the domain name determined by the reverse lookup with a list of enterprise domains that have enabled auto-enrollment by reverse lookup. Auto-enrollment by reverse lookup is enabled by the domain administrator of the domain, typically by enabling the settings on the hosting control panel (e.g., cPanel) of the domain. The domain administrator may optionally specify which auto-enrollment domain that an electronic device needs to map to, where the specified auto-enrollment domain is a subset of the verified domain that the domain administrator has control over. For example, if the domain administrator has a verified domain of "blogofy.com," the domain administrator may request that any service provider operating system enrollment eligibility request from "vpn.blogofy.com" should result in auto-enrollment of the electronic device. The domain administrator may also optionally specify how big the enterprise network is by providing a CIDR block or by providing a comma delimited set of subnets. These additional settings provide alternative ways to authenticate the reverse lookup if there is not a direct match between a reverse lookup and a forward lookup.

In step 270, the service provider server determines if there is a match between the domain name determined by the reverse lookup and an auto-enrollment enabled enterprise domain. For example, if the domain name from the reverse lookup of the host server IP address is "blogofy.com" and the domain "blogofy.com" is on the list of enterprise domains with auto-enrollment enabled, then the server determines that the electronic device that sent the original initialization request is eligible to auto-enroll in the "blogofy.com" domain. In step 280, the service provider server transmits a request to the electronic device to initiate auto-enrollment. For example, the server sends a message back to the electronic device through the host server to initiate auto-enrollment in the "blogofy.com" domain.

Figure 3:
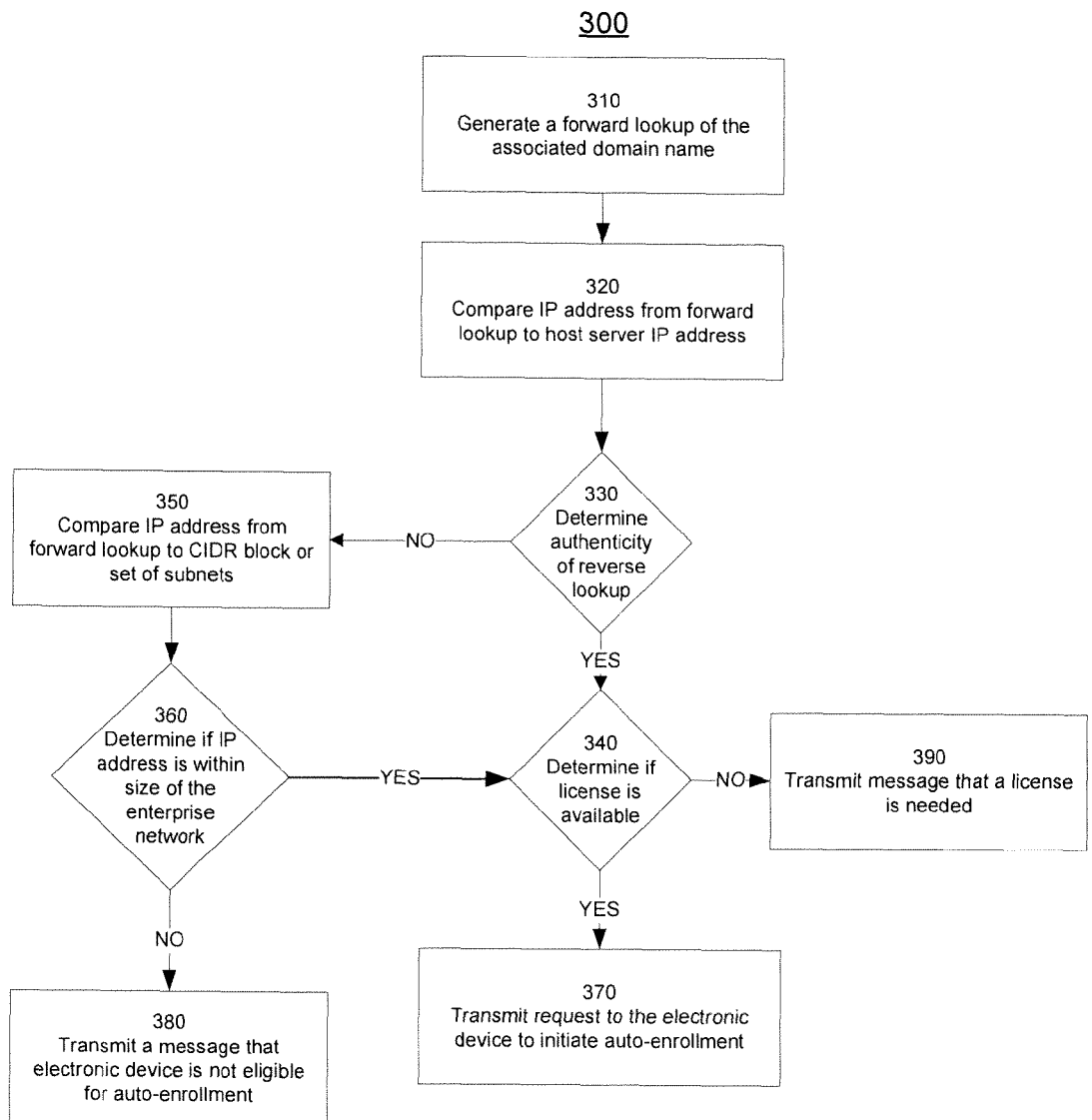
FIG. 3 conceptually illustrates another example process for determining if a client device should auto-enroll in an enterprise domain.

FIG. 3 illustrates a flow diagram of an example process 300 for determining if the authenticity of the reverse lookup performed in process 200 is correct. Process 300 begins at step 310 where the service provider server generates a forward lookup of the associated domain name that was determined from the reverse lookup. For example, if the associated domain name is "vpn.blogofy.com," then a forward lookup of that domain name may yield an IP address of "123.123.123.123." In step 320, the service provider server compares the host server IP address and the IP address from the forward lookup. In step 330, the service provider server determines if the authenticity of the reverse lookup is correct. For example, if the host server IP address is "123.123.123.123" and the IP address of the associated domain name determined in the forward lookup is also "123.123.123.123," then the server determines that there is a match and that the reverse lookup result is authentic and correct. On the other hand, if the host server IP address is "123.123.123.123" and the IP address of the associated domain name determined in the forward lookup is "123.123.123.56," then the server determines that there is not a match.

If the authenticity of the reverse lookup is determined to be correct, the service provider server determines if there is an available license with the enterprise domain for that type of electronic device in step 340. For example, the service provider server may look at a listing of available licenses for the enterprise domain name "vpn.blogofy.com" and determine that there are three licenses available to the "vpn.blogofy.com" domain for smartphone devices based in the United States. In this example, the electronic device requesting initialization is a smartphone that will be based in the United States, so the service provider server determines that there is an available license for this electronic device. If there is an available license, the server sends a request to the electronic device to initiate auto-enrollment with the enterprise domain in step 370. If there is not an available license, the server proceeds to step 390 and transmits a message that a license is needed or required. For example, the message may be sent to the electronic device telling the user of the electronic device to contact the enterprise domain administrator or enterprise help desk for assistance. The message may be sent directly to a contact of the enterprise domain, alerting that contact that an otherwise eligible electronic device cannot be auto-enrolled due to the lack of a license. The message may also be sent to both, or to any other relevant entity.

However, if the authenticity of the reverse lookup is determined not to be correct, in step 350 the service provider server compares the IP address determined from the forward lookup to the size of the enterprise network specified by either a CIDR block or a comma delimited set of subnets that were set up by the enterprise domain administrator. For example, the size of the network specified by the CIDR block and/or the set of subnets may be /24. In step 360, the service provider server determines if the IP address from the forward lookup is within the CIDR range or is part of an identified subnet. If the IP address from the forward lookup is within the size of the network specified by the enterprise domain administrator, then the service provider server proceeds to step 340.

On the other hand, if the IP address from the forward lookup is outside the size range of the network specified by the enterprise domain administrator, then the service provider server proceeds to step 380 and transmits a message that the electronic device is not eligible to auto-enroll in the enterprise domain. The message may be sent to the electronic device, a contact within the enterprise domain (e.g., domain administrator), or both. The message may also be sent to any other relevant entity.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media is not-transitory and does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
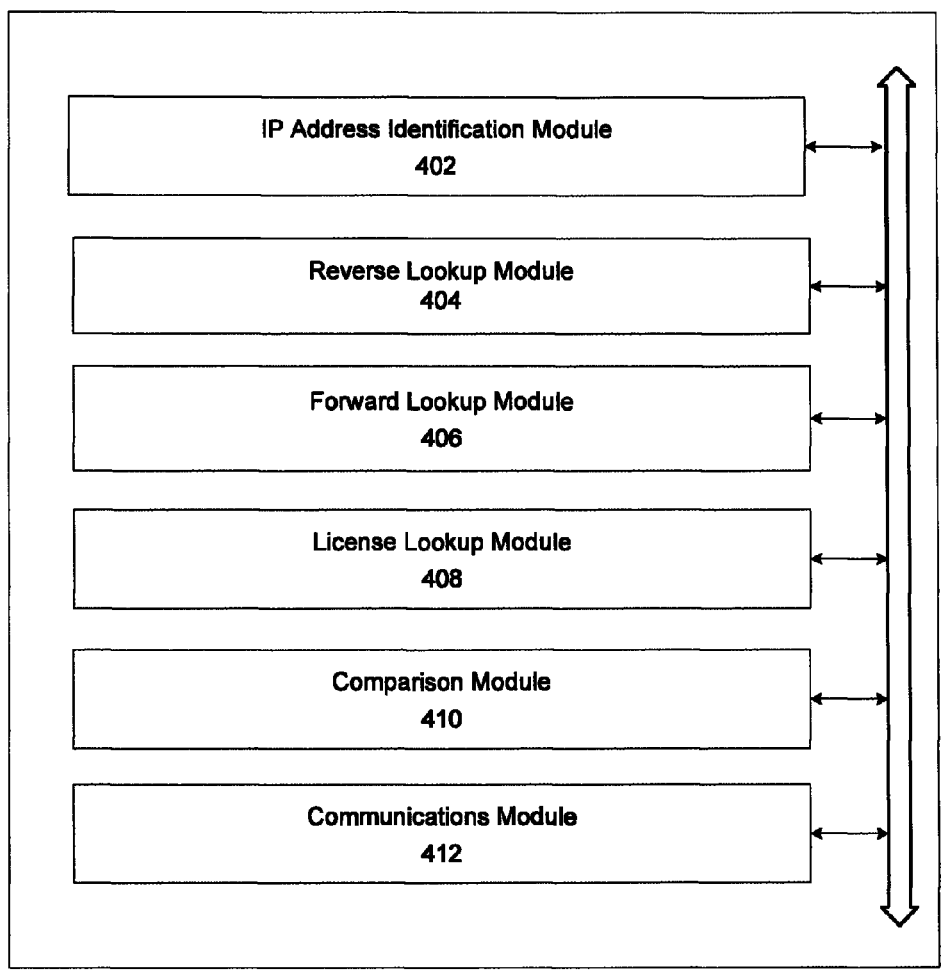
FIG. 4 conceptually illustrates an example of a system for determining if a client device should auto-enroll in an enterprise domain.

FIG. 4 illustrates an example of system 400 for determining eligibility of an electronic device to auto-enroll in an enterprise domain, in accordance with various aspects of the subject technology. System 400 comprises an IP address identification module 402, a reverse lookup module 404, a forward lookup module 406 and a license lookup module 408. The system may also comprise a comparison module 410 and a communications module 412.

The IP address identification module 402 is configured to determine or identify an IP address from various sources (e.g., a message header or a lookup list). The reverse lookup module 404 is configured to generate or perform a reverse lookup based on an identified IP address. The forward lookup module 406 is configured to generate or perform a forward lookup based on a domain name. The license lookup module 408 is configured to perform a lookup of licenses that are available in association with an enterprise domain.

The system may also include a comparison module 410 configured to perform a comparison between a known IP address or domain name and a listing of IP addresses or domain names. The communications module 412 is configured to send and receive messages or requests to other devices or servers.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
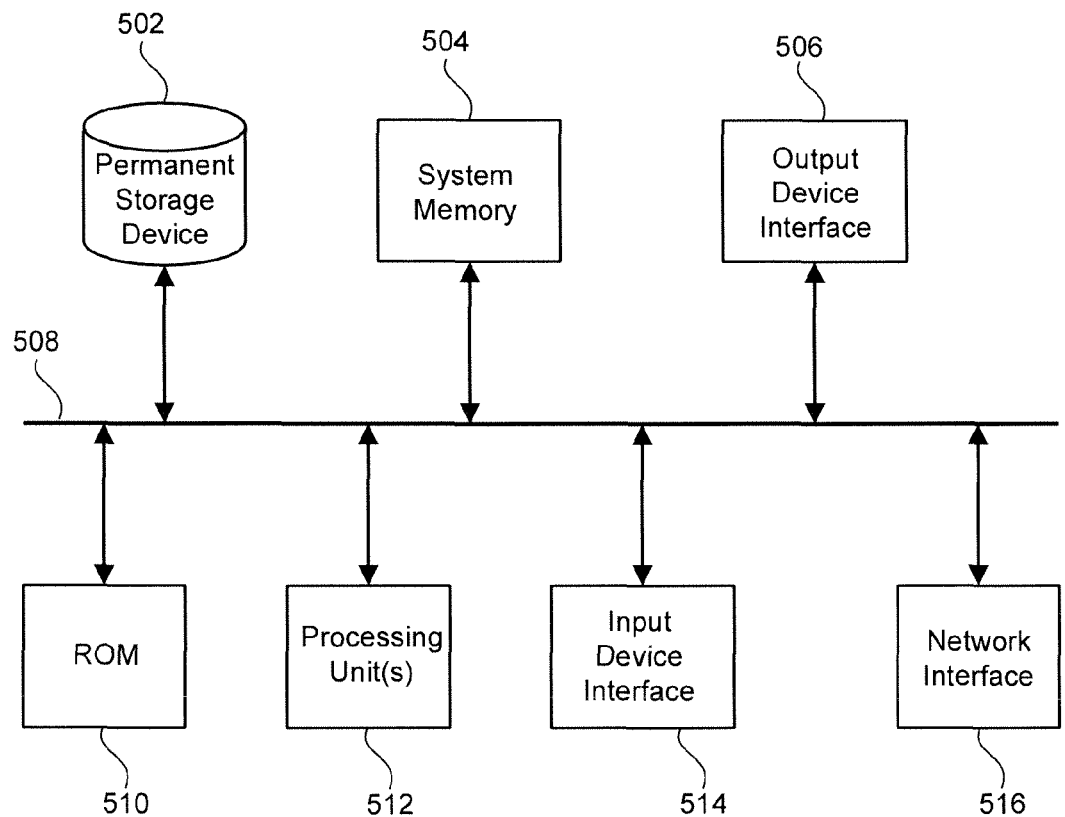
FIG. 5 conceptually illustrates an electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., televisions or other displays with one or more processors coupled thereto or embedded therein, or other appropriate computing devices that can be used for running an application, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for determining auto-enrollment eligibility for an electronic device, the method comprising:
    receiving, at a service provider server, an initialization request from an electronic device;
    identifying an internet protocol (IP) address from which the initialization request was sent;
    generating a reverse lookup of the identified IP address to determine an associated fully qualified domain name;
    comparing the associated fully qualified domain name generated in the reverse lookup with one or more enterprise domains within a list of enterprise domains that have enabled auto-enrollment by reverse lookup; and
    determining, based on the comparison, that the electronic device should initiate auto-enrollment if there is a match between the associated fully qualified domain name and the list of enterprise domains.

2. The method of claim 1, further comprising:
    generating a forward lookup of the associated fully qualified domain name to determine an associated IP address; and
    comparing results of the forward lookup with results of the reverse lookup.

3. The method of claim 2, further comprising:
    if the results of the forward lookup and the reverse lookup match, indicating that the authenticity of the reverse lookup is correct.

4. The method of claim 2, further comprising:
    if the results of the forward lookup and the reverse lookup do not match, comparing the IP address to a list of IP addresses specified by one of a Classless Inter-Domain Routing (CIDR) block and a comma delimited set of subnets.

5. The method of claim 4, further comprising:
    if the IP address is within either the range of the CIDR block or the set of subnets, indicating that the authenticity of the reverse lookup is correct.

6. The method of claim 4, further comprising:
    if the IP address is not within either the range of the CIDR block or the set of subnets, indicating that the authenticity of the reverse lookup is not proven.

7. The method of claim 1, further comprising:
    determining if the associated fully qualified domain name has an available license for the type of the electronic device.

8. The method of claim 7, further comprising:
    if there is an available license for the electronic device type, sending a request to the electronic device to initialize an auto-enrollment process.

9. The method of claim 7, further comprising:
if there is not an available license for the electronic device type, sending a notification to a designated contact at the associated fully qualified domain name.

10. The method of claim 1, wherein the enabled auto-enrollment by reverse lookup comprises specification of a particular auto-enrollment domain that an electronic device needs to map to, wherein the particular auto-enrollment domain is a subset of a verified domain that a domain administrator of the associated fully qualified domain name has control over.

11. A system for determining auto-enrollment eligibility for an electronic device, the system comprising:
a memory storing executable instructions; and
a processor coupled to the memory configured to execute the stored executable instructions to:
receive at a service provider server an initialization request from an electronic device;
identify an interne protocol (IP) address from which the initialization request was sent;
generate a reverse lookup of the identified IP address to determine an associated fully qualified domain name;
compare the associated fully qualified domain name generated in the reverse lookup with one or more enterprise domains within a list of enterprise domains that have enabled auto-enrollment by reverse lookup;
determine, based on the comparison, that the electronic device should initiate auto-enrollment if there is a match between the associated fully qualified domain name and the list of enterprise domains;
determine if the associated fully qualified domain name has an available license for the electronic device type.

12. The system of claim 11, wherein the stored executable instructions further cause the processor to:
generate a forward lookup of the associated fully qualified domain name to determine an associated IP address; and
compare results of the forward lookup with results of the reverse lookup.

13. The system of claim 12, wherein the stored executable instructions further cause the processor to indicate that the authenticity of the reverse lookup is correct if the results of the forward lookup and the reverse lookup match.

14. The system of claim 12, wherein the stored executable instructions further cause the processor to compare the IP address to a list of IP addresses specified by one of a Classless Inter-Domain Routing (CIDR) block and a comma delimited set of subnets if the results of the forward lookup and the reverse lookup do not match.

15. The system of claim 14, wherein the stored executable instructions further cause the processor to indicate that the authenticity of the reverse lookup is correct if the IP address is within either the range of the CIDR block or the set of subnets.

16. The system of claim 14, wherein the stored executable instructions further cause the processor to indicate that the authenticity of the reverse lookup is not proven if the IP address is not within either the range of the CIDR block or the set of subnets.

17. The system of claim 11, wherein the stored executable instructions further cause the processor to send a request to the electronic device to initialize an auto-enrollment process if there is an available license for the electronic device type.

18. The system of claim 11, wherein the stored executable instructions further cause the processor to send a notification to a designated contact at the associated fully qualified domain name if there is not an available license for the electronic device type.

19. The system of claim 11, wherein the enabled auto-enrollment by reverse lookup comprises specification of a particular auto-enrollment domain that an electronic device needs to map to, wherein the particular auto-enrollment domain is a subset of a verified domain that a domain administrator of the associated fully qualified domain name has control over.

20. A non-transitory machine-readable medium comprising instructions stored therein, which when executed by processors, cause the processors to perform operations comprising:
receiving, at a service provider server, an initialization request from an electronic device;
identifying an internet protocol (IP) address from which the initialization request was sent;
generating a reverse lookup of the identified IP address to determine an associated fully qualified domain name;
comparing the associated fully qualified domain name generated in the reverse lookup with one or more enterprise domains within a list of enterprise domains that have enabled auto-enrollment by reverse lookup;
determining if the authenticity of the reverse lookup is correct;
determining that the electronic device is eligible for auto-enrollment if the authenticity of the reverse lookup is correct;
determining if the associated fully qualified domain name has an available license for the type of the electronic device; and
sending a request to the electronic device to initialize an auto-enrollment process if there is an available license for the electronic device type.

* * * * *

UNITED STATES PATENT AND TRADEMARK OFFICE
CERTIFICATE OF CORRECTION

PATENT NO. : 9,065,863 B1
APPLICATION NO. : 13/912105
DATED : June 23, 2015
INVENTOR(S) : Royans Kurian Tharakan et al.

It is certified that error appears in the above-identified patent and that said Letters Patent is hereby corrected as shown below:

In the Claims

In Column 15, Line 19:
Replace "an interne protocol" with --an internet protocol--.

Signed and Sealed this
Thirteenth Day of August, 2019

Andrei Iancu
*Director of the United States Patent and Trademark Office*